US012785436B2

(12) United States Patent
Yvergniaux et al.

(10) Patent No.: US 12,785,436 B2
(45) Date of Patent: Nov. 3, 2026

(54) RECHARGEABLE BATTERY

(71) Applicant: Mov'NTec, Ruitz (FR)

(72) Inventors: Ronan Yvergniaux, Lille (FR); Adam Santamaria, Paris (FR)

(73) Assignee: MOV'NTEC, Ruitz (FR)

( * ) Notice: Subject to any disclaimer, the term of this patent is extended or adjusted under 35 U.S.C. 154(b) by 538 days.

(21) Appl. No.: 18/504,815

(22) Filed: Nov. 8, 2023

(65) Prior Publication Data

US 2024/0154444 A1 May 9, 2024

(30) Foreign Application Priority Data

Nov. 9, 2022 (FR) .................................... 22 11671

(51) Int. Cl.

| | |
|---|---|
| ***H02J 7/90*** | (2026.01) |
| ***H01M 10/42*** | (2006.01) |
| ***H01M 10/48*** | (2006.01) |
| ***H01M 50/51*** | (2021.01) |
| ***H02J 7/50*** | (2026.01) |
| ***H02J 7/80*** | (2026.01) |

(52) U.S. Cl.

CPC ........... *H02J 7/933* (2026.01); *H01M 10/425* (2013.01); *H01M 10/482* (2013.01); *H01M 50/51* (2021.01); *H02J 7/50* (2026.01); *H02J 7/80* (2026.01)

(58) Field of Classification Search

CPC ........................................................ H02J 7/50

See application file for complete search history.

(56) References Cited

U.S. PATENT DOCUMENTS

2019/0273380 A1 9/2019 Collins et al.
2020/0321789 A1 10/2020 Ono et al.

FOREIGN PATENT DOCUMENTS

WO 2013015162 A1 1/2013

OTHER PUBLICATIONS

French Search Report for FR2211671 dated May 31, 2023, 2 pages.

*Primary Examiner* — Ahmed H Omar
(74) *Attorney, Agent, or Firm* — NIXON & VANDERHYE

(57) ABSTRACT

A battery includes: a set of cells connected in series, each cell including an energy storage element; a coil connected in series with the set of cells; a sensor for measuring the intensity flowing between the supply terminals; and a control unit with a device for adding an energy storage element in series in the set of energy storage elements connected in series at a frequency higher than 1 kHz if the measured intensity is higher than a maximum intensity and shunting an energy storage element in series in the set of energy storage elements connected in series if the measured intensity is lower than a minimum intensity.

9 Claims, 3 Drawing Sheets

RECHARGEABLE BATTERY

CROSS-REFERENCE TO RELATED APPLICATIONS

This application claims the priority under 35 USC 119(a) of French patent application 22 11671 filed on Nov. 9, 2022, the entirety of which is incorporated herein by reference.

BACKGROUND OF THE INVENTION

Field of the Invention

The present invention relates to a battery of the type comprising:

- a set of cells connected in series, each cell comprised an energy storage element connected in series with a controllable isolation switch and a controllable shunt switch connected in parallel with the energy storage element and the controllable isolation switch,
- a control unit for the isolating and shunt switches of each cell, the controllable switches of the same cell being in opposite states,
- a coil connected in series with the set of cells connected in series between two power supply terminals; and
- a sensor for measuring the intensity flowing between the power supply terminals.

The batteries are formed of a set of cells each comprising at least one electrical energy storage element. The cells are connected in series, in order to enable the battery to output a high voltage which can attain the sum of the individual voltages of the storage elements of the cells.

Each energy storage element has a maximum acceptable charge intensity and it is recommended to make sure that said intensity is not exceeded during the charging phases.

Description of the Related Art

In order to charge from a plurality of sources of electrical energy, such as the mains, often of 220 or 110 volts AC, a solar panel supplying direct current, or further an electric vehicle charging station also supplying direct current, it is known to provide, between the charging terminals of the battery and the set of energy storage cells, a charger apt to inject an electric current which is the reverse of the current supplied when the cells are discharged.

Chargers are generally composed of a mains regulation circuit consisting of a transformer followed by a diode rectifier then a smoothing by means of a capacitor, and finally a regulation circuit.

The charger is relatively bulky and causes losses during the phases of processing the electric current.

SUMMARY OF THE INVENTION

The goal of the invention is to propose a battery which takes up a limited space and can be charged from different sources of electrical energy while having reduced losses during the recharging thereof.

To this end, the invention relates to a battery of the aforementioned type, characterized in that the control unit is suitable for measuring the voltage coming from the sensor and for controlling the switches at a frequency greater than 1 kHz as a function of the measured intensity; and

- the control unit comprises means for adding, at each cycle, an energy storage element in series in the set of energy storage elements connected in series if the measured intensity is higher than a maximum intensity and shunting an energy storage element in series to all energy storage elements connected in series if the measured intensity is lower than a minimum intensity.

According to particular embodiments, the battery comprises one or a plurality of the following features:

- the battery comprises a disconnection relay connected for the control thereof to the control unit, apt to interrupt the flow of a current between the two terminals and the control unit is apt:
  - while the relay is open, to connect cell storage elements in series in such a number that the voltage at the terminals of the storage elements connected in series is comprised between the power supply voltage and the power supply voltage reduced by a predetermined charge voltage;
  - to close the relay, then the voltage at the terminals of the storage elements connected in series is comprised between the power supply voltage and the power supply voltage reduced by a predetermined charge voltage;
- the battery comprises a rectifier the input of which is connected to the two power supply terminals through the coil, the set of cells connected in series being connected to the output of the rectifier;
- the rectifier comprises a diode bridge;
- the battery has no charger between the power supply terminals and the set of cells connected in series;
- the charge voltage is lower than or equal to the maximum charge voltage of one of the energy storage elements;
- the battery comprises means for measuring the voltage of each energy storage element connected to the control unit and the control unit is apt to control the switches of the cells according to the voltage measured at the terminals of each storage element;
- the inductance of the coil is greater than $$\frac{R_L}{f\ln\left(1-\frac{R_L I_{max}}{U_L}\right)},$$

where $R_L$ is the resistance of the coil, f is the measurement and control frequency, $I_{max}$ is the maximum charge intensity of a cell, $U_L$ is the maximum charge voltage of a cell and ln is the natural logarithm; and
- the inductance of the coil is comprised between 1 μH and 1 mH.

BRIEF DESCRIPTION OF THE DRAWINGS

The invention will be better understood upon reading the following description, given only as an example and making reference to the drawings, wherein.

DETAILED DESCRIPTION

Figure 1:
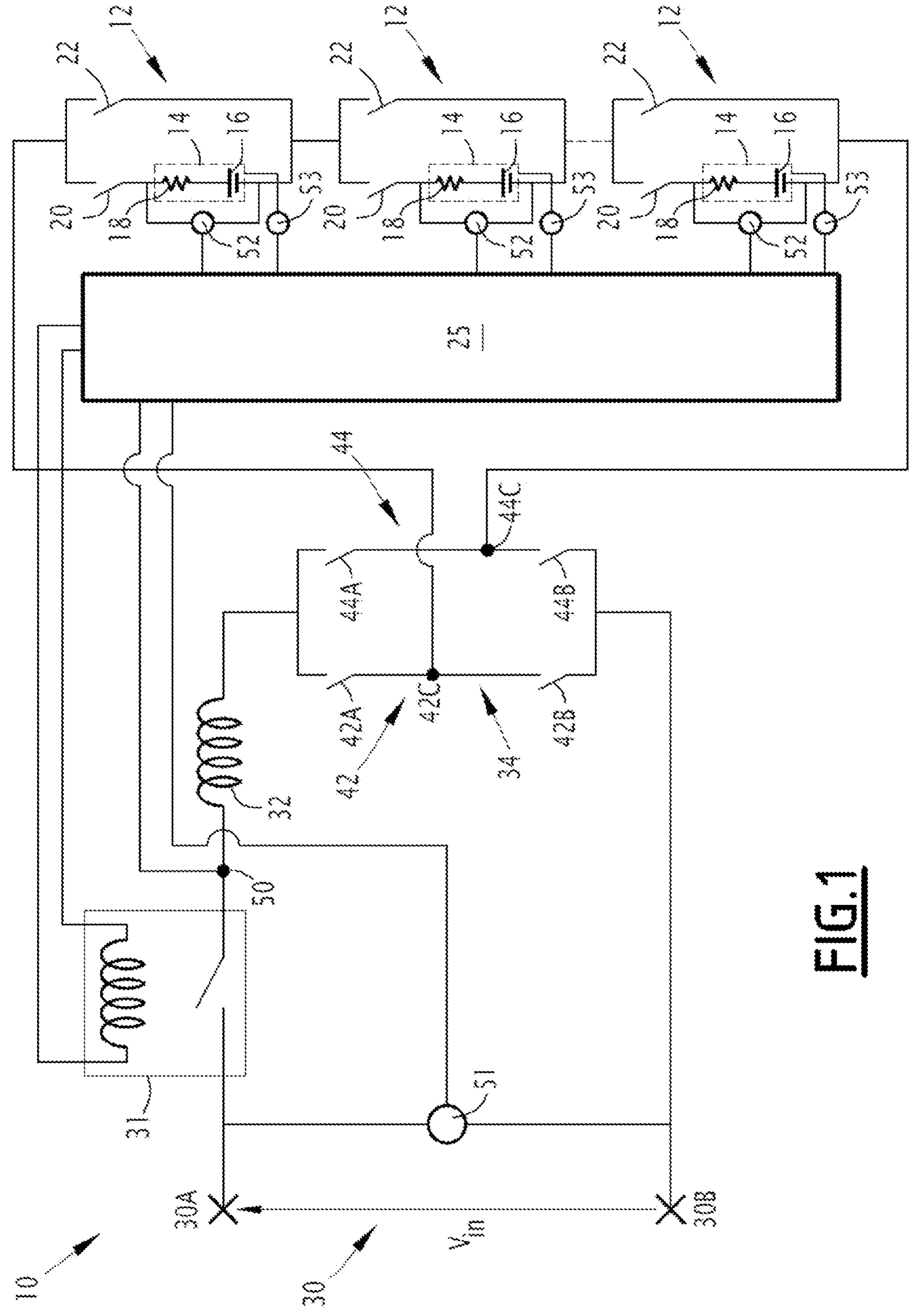
FIG. 1 is a schematic view of a battery according to the invention.

The battery 10 illustrated in FIG. 1 comprises a set of identical cells 12 connected in series for the storage of electrical energy. In FIG. 1, only three cells are shown. In practice, the number of cells is much greater and e.g. equal to 128.

Each cell 12 comprises an energy storage element 14 schematically represented by an accumulator 16 mounted in series with a resistor 18. In practice, the resistor 18 is the resistor of the accumulator 16.

Each energy storage element 14 has e.g. a maximum charge intensity of three amperes and is apt to produce at the terminals thereof a maximum voltage of 4.2 volts when the element is charged. The voltage at the terminals thereof varies from 2.8 V to 4.2 V depending on the state of charge thereof.

In each cell, the energy storage element 14 is connected in series with a controllable isolation switch 20 for the energy storage element 14. Furthermore, the cell comprises a controllable shunt switch 22 connected in parallel with the set formed by the storage element 14 and the isolation switch 20.

The switches 20 and 22 of each cell are controlled independently from one cell to another by being connected to a control unit 25.

The isolation switch 20 and the shunt switch 22 of each cell are connected and/or controlled so that same are systematically in opposite states, i.e. that when the shunt switch 22 is closed, the isolation switch 20 is open and vice versa.

The cells 12 are connected in series in order to form the set of cells.

The battery has a battery charge input 30 to which the set of cells is connected via a relay 31, a coil 32 and a rectifier 34.

More precisely, the input 30 comprises two terminals 30A, 30B suitable for receiving a voltage denoted by $V_{in}$. The relay 31, the coil 32 and the input of the rectifier 34 are connected in series between the terminals 30A and 30B. The coil 32 has an inductance comprised between 1 μH and 1 mH.

The relay 31 is connected to the control unit 25 so as to be controlled between the open and the closed state thereof.

As is known per se, the rectifier comprises two branches 42, 44 connected in parallel to the inputs thereof. Each branch comprises two controlled switches 42A, 42B, 44A, 44B.

The set of cells is connected to the midpoints 42C, 44C of each branch, formed by the connection points between the two controlled switches of the same branch. The midpoints form the outputs of the rectifier.

In order to be controlled, the four switches of the rectifier 34 are connected to the control unit 25 according to a control law known per se.

In a variant, the rectifier 24 is formed by a diode bridge, the structure of which corresponds to that of the structure described hereinabove, replacing the switches controlled by diodes.

Furthermore, a current sensor 50 is arranged between the relay 31 and the coil 32, for measuring the charge intensity $I_{ch}$. A voltage sensor 51 is provided between the terminals 30A, 30B for measuring the input voltage $V_{in}$. The sensors are connected to the control unit 25.

Each cell 12 further comprises a sensor 52 for measuring the voltage across the terminals of the energy storage element 14 of the cell and a sensor 53 for measuring the temperature of the cell. The sensors are connected to the control unit 25.

To recharge the battery, the inputs 30A and 30B are connected to an electrical power supply such as the collective power supply network under 110 volts or 230 volts AC, a solar panel or again another battery.

The algorithm implemented by the control unit 25 continuously sorts the cells 12 in order to classify, in order of preference, the cells the energy storage elements of which are to be connected or disconnected from the set of connected storage elements depending on the input current $I_{ch}$ induced by the input voltage $V_{in}$.

Figure 2:
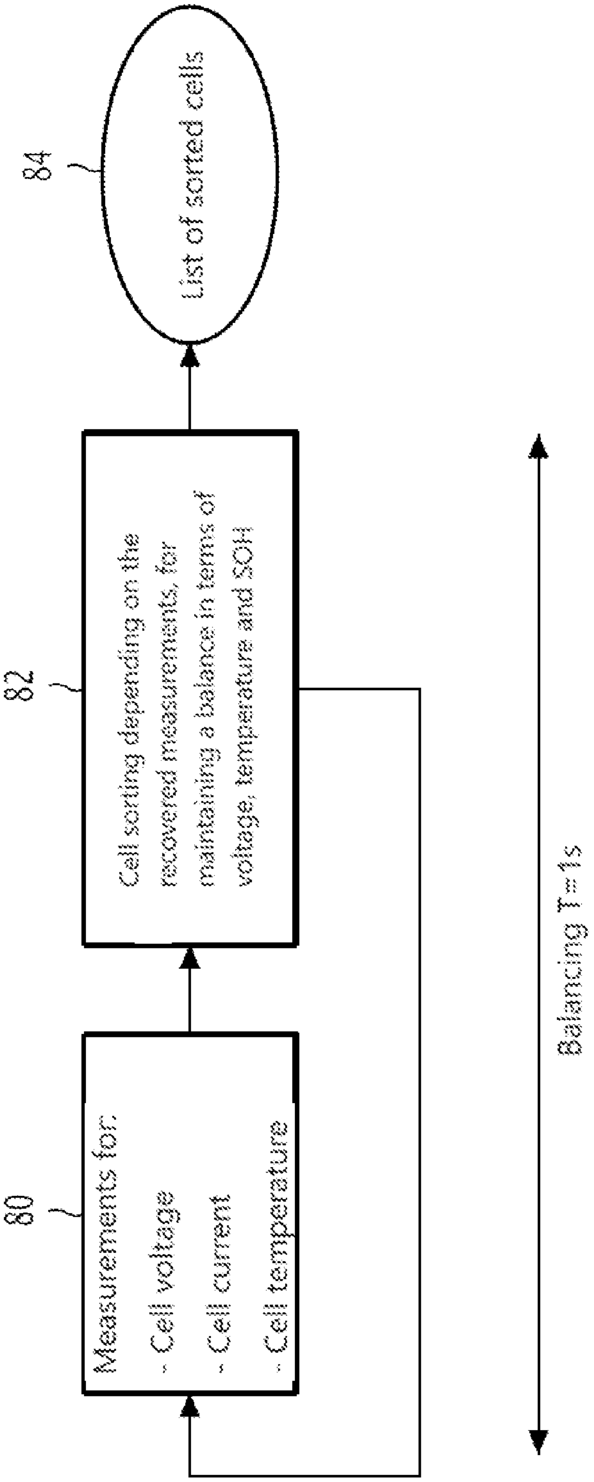
FIG. 2 is a flowchart illustrating the choice of cells the energy storage elements which should be connected in priority.

To this end, and as illustrated in FIG. 2, voltage and temperature measurements are carried out on each cell and a sorting of the cells is carried out cyclically. The control unit provides the measurement and the sorting at a reduced frequency e.g. of 1 Hz. During the step 80, a measurement of the voltage at the terminals of each cell is taken from the sensors 52 and a measurement of the temperature of each cell is taken from the sensors 53. Similarly, a measurement of the current $I_{ch}$ applied to the cells is taken from the sensor 50.

During the step 82, the cells are sorted according to measurements taken in order to maintain a balance in terms of voltage, of temperature and of health (commonly referred to by the acronym SOH (state of health)).

Starting from the sorting performed during the step 82, a list of sorted cells denoted by 84 is updated at each cycle, e.g. every second when the processing frequency is 1 Hz.

Figure 3:
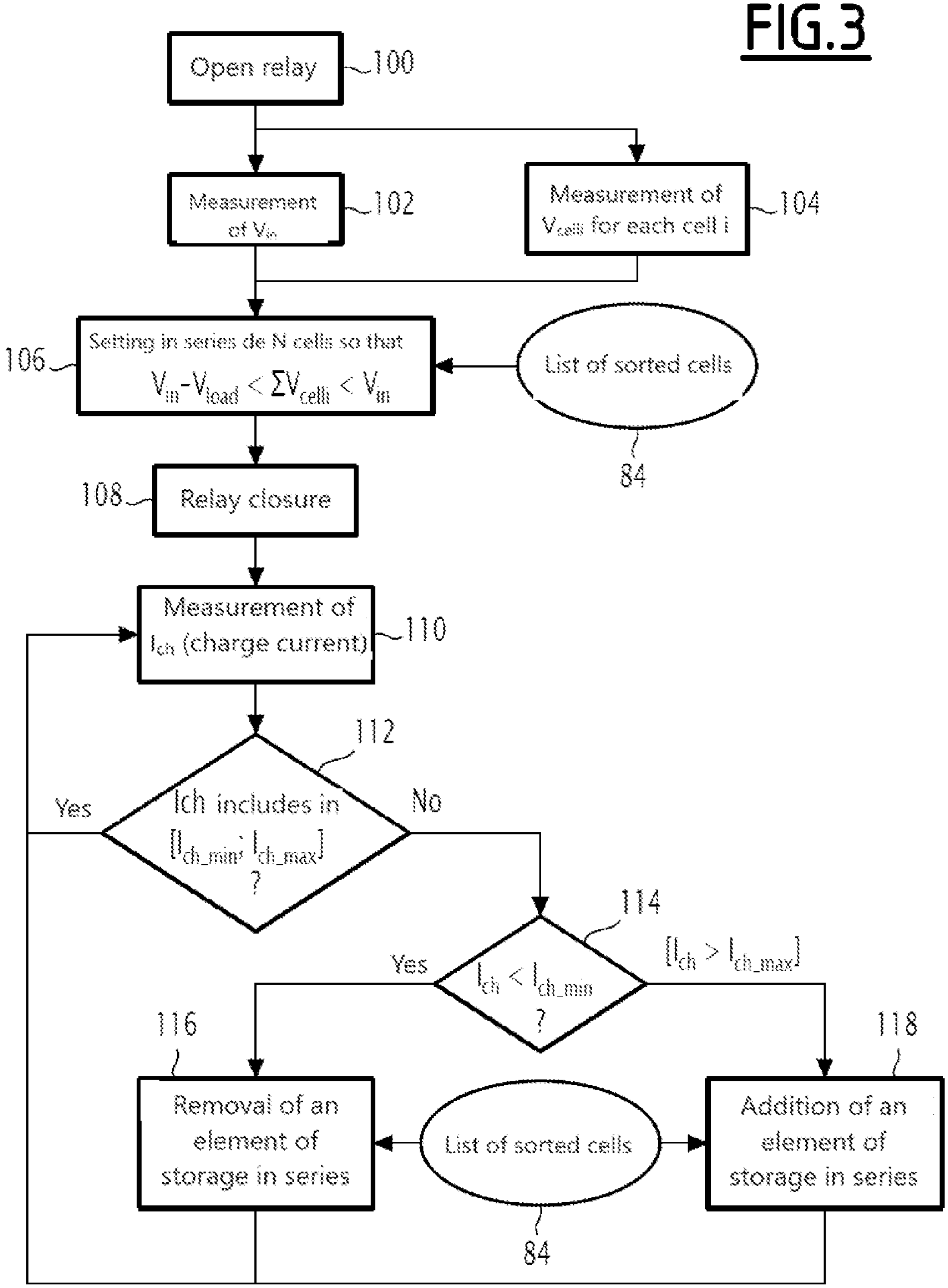
FIG. 3 is a flow chart illustrating the control of the battery during the charging thereof.

For recharging the battery, and simultaneously with the implementation of the algorithm shown in FIG. 2, the algorithm shown in FIG. 3 is implemented by the control unit 25 in order to recharge the cells.

Initially, the relay 31 is opened during the step 100, before the charging begins.

During the step 102, the control unit 25 measures the voltage $V_{in}$ at the input 30 by means of the sensor 51. Similarly, during the step 104, the control unit measures the voltage $U_{cell}$ of each cell 12, the index i being representative of the cell considered.

During the step 106, the control unit 25 selects, from the voltage $V_{in}$ and a predetermined charge voltage $V_{load}$, the storage elements of the cells to be connected in series. The selected cells are such that the sum of the voltages at the terminals of said cells is comprised between the measured voltage $V_{in}$ minus a predefined charge voltage $V_{load}$ and the voltage $V_{in}$.

Thereby, the selected cells satisfy the relation $V_{in}-V_{load}<\Sigma U_{celli}<V_{in}$, where $\Sigma U_{celli}$ represents the sum of the voltages at the terminals of the only cells selected so that the storage elements are connected in series.

Advantageously, the voltage $V_{load}$ is chosen, i.e. 4.2 V in the example considered of the set of energy storage elements 14.

The selected cells are chosen in priority in the order of table 84 giving the list of sorted cells. According to a particular embodiment, the cells are chosen in the reverse order of the state of charge of the cells, i.e. in the reverse order of the voltage measured at the terminals thereof.

During the step 108, the isolation switches 20 of the selected cells are closed while the shunt switches 22 of the selected cells are open. On the other hand, for the non-selected cells, the states of the controlled switches are opposite, the isolation switches 20 being open and the shunt switches 22 being closed. Thereby, only the storage elements of the selected cells are connected in series.

The relay 31 is then closed during the step 108.

The control unit 25 is apt to provide measurements and a cyclic control of the cell connection and disconnection at a frequency greater than 1 kiloHertz and preferentially substantially equal to 20 kiloHertz.

For each cycle, the control unit 25 implements the following steps of the flow chart illustrated in FIG. 3.

During the step 110, the charge current $I_{ch}$ is measured by the intensity sensor 31.

During the step 112, the measured current is compared to a defined range of acceptable charge current [$I_{ch\_min}$; $I_{ch\_max}$] where $I_{ch\_min}$ is a minimum charge value and $I_{ch\_max}$ is a maximum charge value. If each cell accepts, by construction, a maximum charge current of three amperes, the maximum charge current $I_{ch\_max}$ is taken to be equal to 2.4 amperes and the minimum charge current $I_{ch\_min}$ is taken to be equal to 1.5 amperes.

If the charge current measured during the step 112 is comprised within the range of charge current, the step 110 is used again.

On the other hand, if the current is outside the acceptable range, the charge current 114 is compared with the minimum charge current $I_{ch\_min}$.

If the charge current $I_{ch}$ is lower, a storage element of a cell is removed from the storage elements connected in series. For this purpose, the storage element is shunted by control of the cell shunt switch and the cell isolation switch is opened.

The cell the storage state of which is deducted is chosen in priority according to the order of the list contained in table 84.

On the other hand, if during the step 114, the charge current $I_{ch}$ is higher than the maximum charge current $I_{ch\_max}$, the storage element of a cell is added during the step 118 in the set of storage elements connected in series.

The cell the storage element of which is added in series is chosen from the list of sorted cells listed in Table 84.

To add the storage element, the shunt switch of the retained cell is open while the isolation switch of the cell is closed.

The loop started during the step 110 is implemented at a high frequency, e.g. equal to 20 kilohertz.

It is thereby understood that whatever the supply voltage, the charge current of the cells is kept within the acceptable current range, even if the power supply voltage is sinusoidal or of any other shape.

Since the control frequency for the steps 110 and following is high, and since the coil 32 reduces the rate of change of the intensity, during a control cycle, the intensity cannot increase too rapidly and exceed the acceptable intensity for the cells forming the battery during a cycle.

The steps 110 and following are used again during the following cycle.

It should be understood that initially during the first charge cycle, the voltage applied to all of the selected cells the storage elements of which are connected in series during the charging is comprised between 0 and $V_{load}$, $V_{load}$ being equal to the maximum charge voltage of a cell. By implementing the algorithm, the voltage applied to all the cells is lower than the voltage of the most charged cell.

Furthermore, each cell having a specific resistance 18 of a value R, the maximum intensity of the current flowing in the cells is equal to $$\frac{V_{in} - \sum U_{celli}}{\sum R}$$

and the current is lower than $$\frac{V_{load}}{\sum R}$$

where the $\Sigma U_{cell}$ in and $\Sigma U$ are the sum of the voltages and the sum of the resistances, respectively, of the selected cells effectively connected in series.

By construction of a cell and since $V_{load}$ is equal to the maximum voltage at the terminals of a cell, $$\frac{V_{load}}{R}$$

is lower than the intensity of the maximum charge current, considered herein equal to 3 A and consequently $$\frac{V_{load}}{\sum R}$$

R is lower as well.

Furthermore, the coil 32 ensures a delay of the current transmitted to all of the cells, allowing the frequency of the control unit 25 to ensure a connection of a sufficient number of cells so as to prevent the current flowing in all the cells from being higher than the maximum intensity taken herein to be equal to 3 Amps throughout the cycle.

To this end, the coil 32 is dimensioned so that over a period of one cycle, the intensity flowing through all the cells cannot exceed 3 Amps.

To this end, advantageously the coil 32 has an inductance greater than $$\frac{R_L}{f\ln\left(1 - \frac{R_L I_{max}}{U_L}\right)},$$

where $R_L$ is the resistance of the coil 32, f is the measurement and control frequency, $I_{max}$ is the maximum charge intensity of a cell, $U_L$ is the maximum charge voltage of a cell and ln is the natural logarithm.

The invention claimed is:

1. Battery comprising:

a set of cells connected in series, each cell comprising an energy storage element connected in series with a controllable isolation switch and a controllable shunt switch connected in parallel with the energy storage element and the controllable isolation switch, a control unit for the isolation and shunt switches of each cell, the controllable switches of the same cell being in opposite states, a coil connected in series with the set of cells connected in series between two power supply terminals, and a sensor for measuring the intensity flowing between the supply terminals, wherein the control unit is suitable for measuring the voltage coming from the sensor and for controlling the switches at a frequency higher than 1 kHz as a function of the measured intensity, and the control unit comprises means for adding, at each cycle, an energy storage element in series in the set of energy storage elements connected in series if the measured intensity is higher than a maximum intensity, and shunting an energy storage element in series in the set of energy storage elements connected in series if the measured intensity is lower than a minimum intensity.

2. The battery according to claim 1, wherein the battery comprises a disconnecting relay connected for the control thereof to the control unit, apt to interrupt the flow of a current between the two terminals and wherein the control unit is apt:

while the relay is open, to connect storage elements of the cells in series in such a number that the voltage at the terminals of the storage elements connected in series is comprised between the supply voltage and the supply voltage reduced by a predetermined charge voltage;

to close the relay, then the voltage at the terminals of the storage elements connected in series is comprised between the power supply voltage and the power supply voltage reduced by a predetermined charge voltage.

3. The battery according to claim 1, wherein the battery comprises a rectifier the input of which is connected to the two supply terminals through the coil, the set of cells connected in series being connected to the output of the rectifier.

4. The battery according to claim 3, wherein the rectifier comprises a diode bridge.

5. The battery according to claim 1, wherein the battery has no charger between the power supply terminals and the set of cells connected in series.

6. The battery according to claim 1, wherein the charge voltage is less than or equal to the maximum charge voltage of one of the energy storage elements.

7. The battery according to claim 1, wherein the battery comprises means for measuring the voltage of each energy storage element connected to the control unit and the control unit is apt to control the switches of the cells according to the voltage measured at the terminals of each storage element.

8. The battery according to claim 1, wherein the inductance of the coil is greater than $$\frac{R_L}{f\ln\left(1-\frac{R_L I_{max}}{U_L}\right)}$$

where $R_L$ is the resistance of the coil, f is the measurement and control frequency, $I_{max}$ is the maximum charge intensity of a cell, $U_L$ is the maximum charge voltage of a cell and ln is the natural logarithm.

9. The battery according to claim 1, wherein the inductance of the coil is comprised between 1 μH and 1 mH.

* * * * *